Oct. 14, 1952  E. C. MARULLI  2,613,978
DETACHABLE HANDLE FOR CUPCAKE PANS AND THE LIKE
Filed March 21, 1950
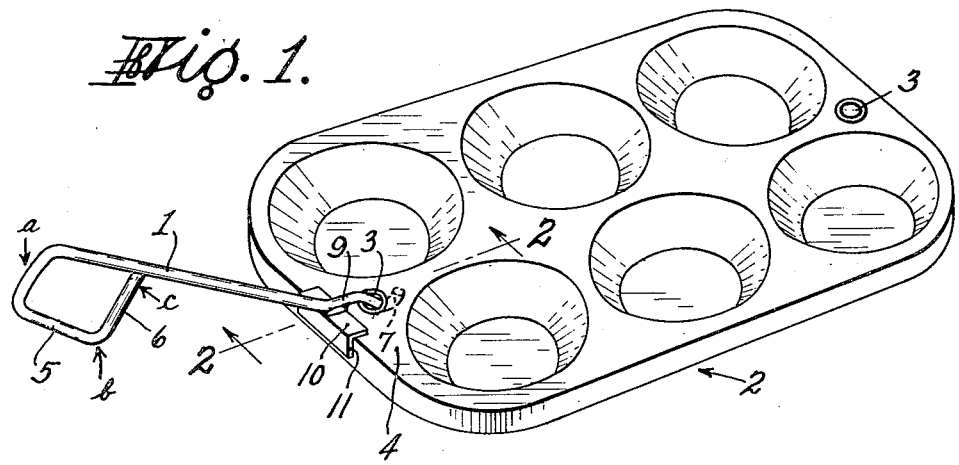
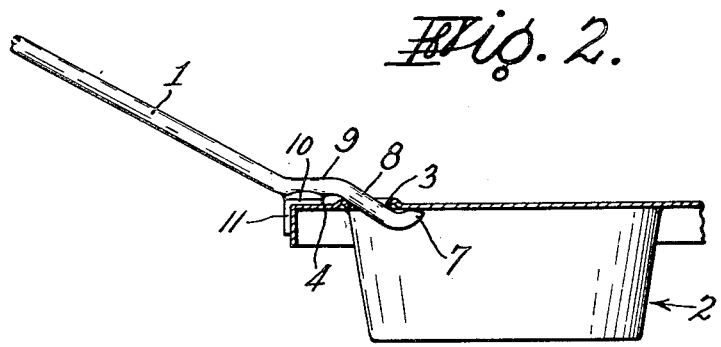
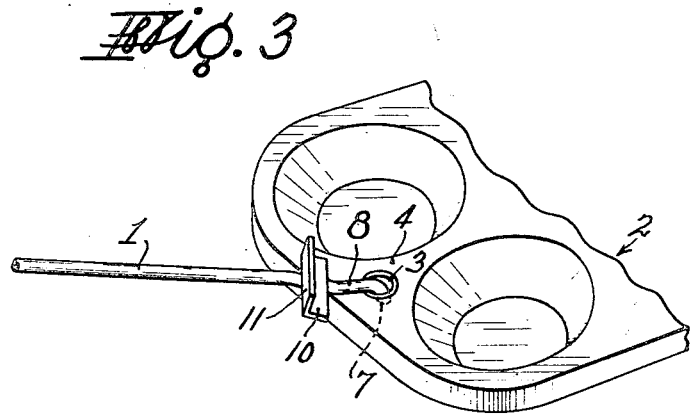
INVENTOR
*Ernesto C. Marulli*
BY *Chapin & Neal*
ATTORNEYS Patented Oct. 14, 1952

2,613,978

UNITED STATES PATENT OFFICE 2,613,978

DETACHABLE HANDLE FOR CUPCAKE PANS AND THE LIKE

Ernesto C. Marulli, Holyoke, Mass.

Application March 21, 1950, Serial No. 150,970

1 Claim. (Cl. 294—27)

This invention relates to detachable handle devices for manipulating cupcake baking pans and the like. Such devices are used to handle cooking pans, pie plates, etc., by detachably engaging the same and lifting them into and out of an oven.

A principal object of the invention is to provide a novel detachable device of simplified construction by means of which such pans as they are now commonly constructed may be readily and easily manipulated while in the oven or when it is desired to remove them therefrom.

More specifically it is an object of the invention to provide a device to removably hold a pan and prevent lateral shifting of the same on the handle. A further object is to provide a manual grip which will enable a more convenient holding of the device for manipulating the pan in any manner desired.

The manner in which these and other objects are achieved will be best understood from a consideration of the following specification and accompanying drawings, in which:

Fig. 1 is a perspective view of a handle according to the invention, with the same engaged in a cupcake pan for manipulation thereof;

Fig. 2 is a sectional view taken on line 2—2 of Fig. 1; and

Fig. 3 shows the handle device as used to manipulate and slide a pan without lifting the same and indicating a manner of attaching the device on the pan.

Referring to the drawings, it is seen that the new device comprises a rigid elongated shank 1 of stiff wire with pan-engaging portions at one end for engaging a cupcake pan 2 and a manually engageable handle portion at the other end thereof for grasping the same.

The pan 2, as will be apparent, represents a usual type of cooking utensil for cupcakes, muffins, etc. It is as shown commonly provided centrally at each end with a vertically disposed eyelet opening 3 in the horizontal marginal flanged portion 4 of the pan. The eyelets are spaced from the peripheral edge of the flange 4 and are ordinarily used for hanging on a nail or hook when not in use. The device of this present invention is adapted for cooperation with this common type of pan construction.

The shank 1 of stiff wire construction has at its outer end an extension of the shank wire bent to form a handle portion. It is a reversely bent loop 5 lying with the tip of the extension adjacent the underside of the shank. The end portion 6 of the loop is substantially at right angles to the shank 1 so as to provide a finger grip.

At the inner end of the shank the wire is extended angularly and forwardly to provide a lever gripping portion for the device. The tip 7 of the device at this end is adapted to project into one of the eyelet openings 3 of the marginal flange. The tip as shown is upwardly curled to bear, when in engaging position, against the under surface of the flange. An outer end section 8 of the gripping portion adjacent the tip is generally parallel to the shank 1 and is angularly positioned in the opening 3. Section 8 is integrally connected with the shank by a fulcrum bearing portion 9 which is angularly extended forwardly from the shank in an upward direction therefrom. On the under surface of the portion 9 and transversely thereof is a fulcrum plate 10 fixed as by welding to portion 9. Plate 10 is adapted to lie at the marginal edge of the pan on the horizontal surface of the flange 4—4. It is also provided with a downwardly directed flange 11 at right angles to the plate, the flange 11 being adapted to bear against the vertically faced edge of flange 4.

It will be seen that the bearing surface of plate 10 is in substantially co-planar relationship with the top surface of the upwardly curled tip 7, so that the plate lies snugly against the flange 4 when the device is in engaged position for lifting. The flanged fulcrum plate thus permits the user to hold the pan tilted as may be desired for manipulating it into and out of the hot oven.

In using the device the lever gripping portion may engage the pan by the direct insertion of the tip end 7 into the eyelet 3. It will also be seen by Fig. 3 that the tip 7 may be inserted by inverting the device. The tip is downwardly curled to engage the eyelet. The device may be rolled from this inverted position to turn the tip upwardly under the flange 4 and the plate 10 rested on the edge. In doing so the angular relation of the shank is kept as near as possible to that of the engaged position of the device. The user's hands therefore may remain remote from the burning heat of an oven or fire. It will also be appreciated from Fig. 3 that the device can be used in this position to slide and adjust the position of a hot pan on a support without the interlocking engagement.

It will be noted that the manual grip formed by the loop 5 lies in a plane transverse to the plane of the fulcrum support plate 10. It is of a size to lie in the user's hand with the rear part thereof against the heel of the palm and the fingers curled around the portion 6. Thus a pistol butt type of hand grip is provided which enables an efficient control against any tendency of a pan to roll in the hand when shifting the pan from one support to another. With the braced effect of this type of handle the user can lift and manipulate the pan with approximately the same ease and speed possible were the pan being directly handled.

Such efficient control is due, in part, to the rigid interlocking action of the pan-engaging elements, but the construction of the gripping elements is also of importance when combined with said engaging elements. The three points of application of force on the grip may be considered as located at $a$, $b$, and $c$. These are relatively widely distributed, with respect to the size of the human hand, so as to be able to take full advantage of the moment-arms provided across the area of the hand, while at the same time affording manual gripping members close enough together to allow a firm grasp and control for translating the motion of the user's hand. The hand grip portions in combination with the pan-engaging elements, provide a most convenient and efficient device to manipulate a baking pan in any desired manner.

Having described my invention I claim:

A detachable handle device for manipulating a cupcake pan and the like having a horizontal flange at the marginal edge of the pan and a vertically disposed circular eyelet opening in the flange spaced from the outer edge thereof, said device comprising an elongated shank of stiff round wire having at its outer end an integral extension of said wire bent reversely as a loop to provide a handle portion with the tip of said extension lying adjacent said shank and forming a pistol butt type of hand grip, said shank at its other end extending angularly and forwardly thereof in the plane of the handle grip and shank and providing an integral lever gripping portion for said device, said gripping portion at its outer end having a section thereof in parallel offset relation to said shank with a short upwardly curled tip end, a fulcrum bearing section of said gripping portion extending in forwardly and upwardly angled relation to said shank and joining the shank and offset parallel section and provided with a horizontally disposed angle iron having one side fixed to the underside transversely of said fulcrum bearing section adjacent said shank for a fulcrum bearing plate and the other side of the angle iron being rearwardly and vertically disposed in depending relation to said plate for nesting the vertical edge of a pan in the angle between said sides upon insertion of said curled tip end of the device through the eyelet opening to bear against the undersurface of said pan, said angle iron extending laterally at each side of said bearing section a substantial distance for maintaining said nested relation and the lateral stability of said pan when supported by said device.

ERNESTO C. MARULLI.

REFERENCES CITED

The following references are of record in the file of this patent:

UNITED STATES PATENTS

| Number | Name | Date |
|---|---|---|
| 590,509 | Blomberg | Sept. 21, 1897 |
| 857,228 | Boyd | June 18, 1907 |
| 1,017,561 | Klossner | Feb. 13, 1912 |